United States Patent [19]
Kurono et al.

[11] 3,821,279
[45] June 28, 1974

[54] 4-HYDROXYBUTYL, 6-HYDROXYHEXYL AND 8-HYDROXY- OCTYL PROSTAGLANDIN ESTERS

[75] Inventors: Masayasu Kurono, Osaka; Fusae Komoto, Kyoto; Takeshi Chiba; Masaki Hayashi, both of Takatsuki, all of Japan

[73] Assignee: Ono Pharmaceutical Co., Ltd.

[22] Filed: Nov. 11, 1971

[21] Appl. No.: 197,930

[30] Foreign Application Priority Data
Dec. 7, 1970  Japan.......................... 45-108291

[52] U.S. Cl...... 260/468 D, 260/514 D, 260/240 R, 260/545 R, 260/295 S, 260/295 R, 260/326 A, 260/347.4, 260/340.5, 260/545 R, 424/305, 424/285
[51] Int. Cl............................................. C07c 69/74
[58] Field of Search.................. 260/468 D, 514 D

[56] References Cited
UNITED STATES PATENTS
3,598,858  8/1971  Bergstrom et al............. 260/468 D
3,691,216  9/1972  Bergstrom et al............. 260/468 D
3,728,382  4/1973  Bundy............................ 260/468 D
3,729,502  4/1973  Beal et al....................... 260/468 D

OTHER PUBLICATIONS

Organic Synthesis–Migrdichian (1957), Vol. I, Pages 323–325, Reinhold Publishing Corp.

Kirk–Othmer, Encyclopedia of Chemical Technology 2nd Ed., Vol. 8, (1965), page. 335.

*Primary Examiner*—John D. Randolph
*Assistant Examiner*—S. D. Winters
*Attorney, Agent, or Firm*—Bierman & Bierman

[57] ABSTRACT

Prostaglandin esters are prepared by converting prostanoic acid into tertiary amine salts, reacting the salts with an alkylsulfonyl halide or phenylsulfonyl halide to form a mixed acid anhydride of carboxylic acid and sulphonic acid. The anhydride is then reacted with an alcohol to form prostaglandin esters.

13 Claims, No Drawings

4-HYDROXYBUTYL, 6-HYDROXYHEXYL AND 8-HYDROXY-OCTYL PROSTAGLANDIN ESTERS

This invention relates to a process for producing prostaglandin esters.

Prostaglandins occur or exist in various tissues of animals and are secreted within living bodies, and are known as new hormones which act, even in a slight amount, on smooth nucleus, blood pressures and lipid metabolisms or the like.

It has already been proposed to produce esters of prostaglandins by reacting a diazo alkyl with a prostaglandin (Japanese Patent Application No. 44-70140/69) of by using dicyclohexyl carbodiimide (Japanese Patent Application No. 45-64911/70). However, in such processes, it is difficult to produce an ester of an alcohol containing a nitrogen atom, an alcohol containing a hydroxyl group which is easily subjected to intermolecular dehydration, or an alcohol having a steric hindrance.

We have now found an improved and economical method for producing prostaglandin esters which can be effectively carried out regardless of the structure of the alcohol.

Thus according to this invention there is provided a process for producing prostaglandin esters characterised by converting a prostaglandin into its tertiary amine salt, reacting said salt with an alkylsulfonyl halide or phenylsulfonyl halide to form a mixed acid anhydride of carboxylic acid and sulfonic acid, and then reacting said anhydride with an alcohol.

As for the prostaglandin, any of prostaglandin $E_1$, prostaglandin $E_2$, prostaglandin $F_2$, prostaglandin $A_1$ and and prostaglandin $A_2$ may be used.

Thus the reactions of this invention may be represented by the following formulae depending upon the respective prostaglandins used.

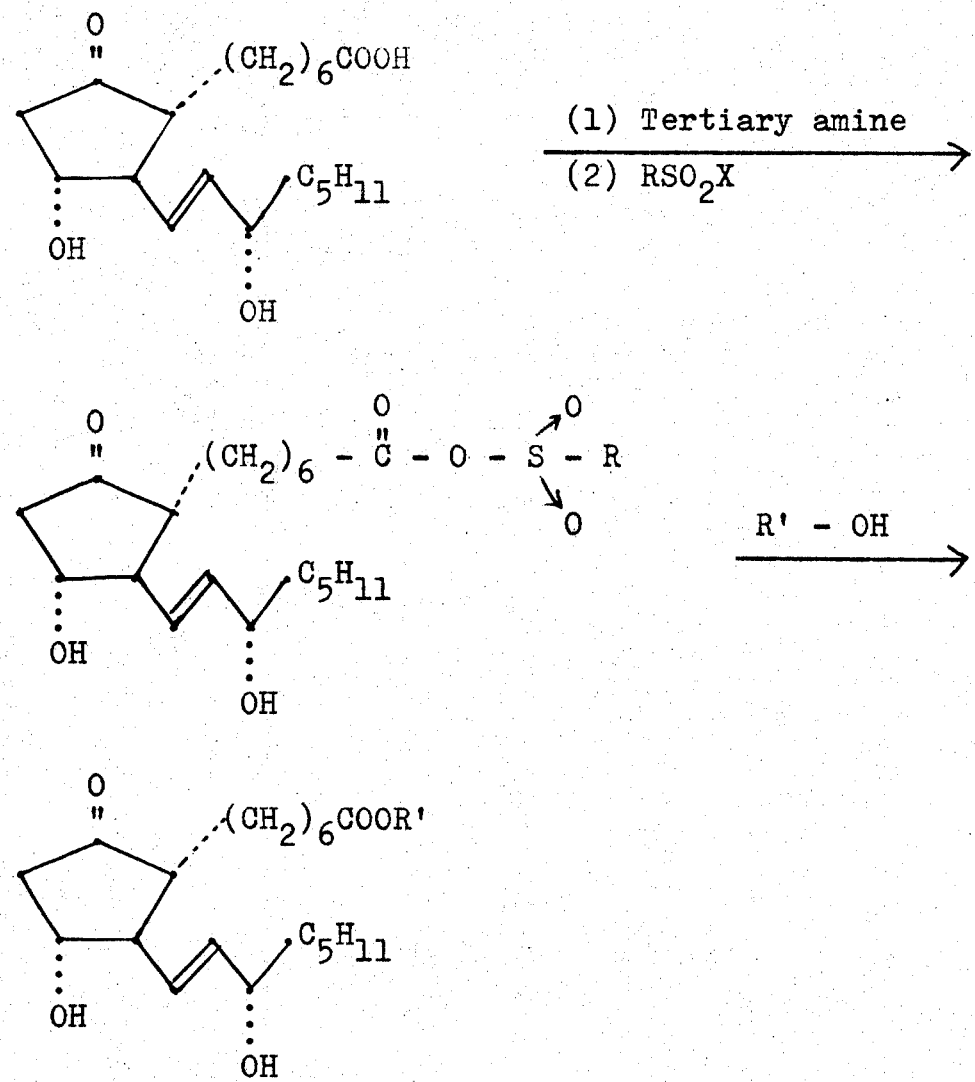

Prostaglandin $E_1$

Prostaglandin $E_2$
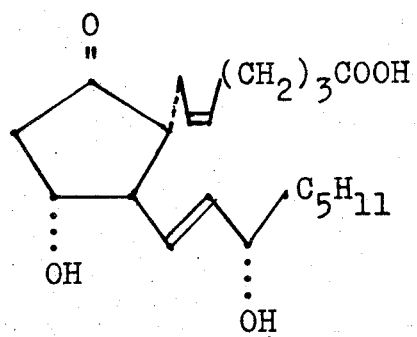
$\xrightarrow{\text{(1) Tertiary amine}}{\text{(2) } RSO_2X}$
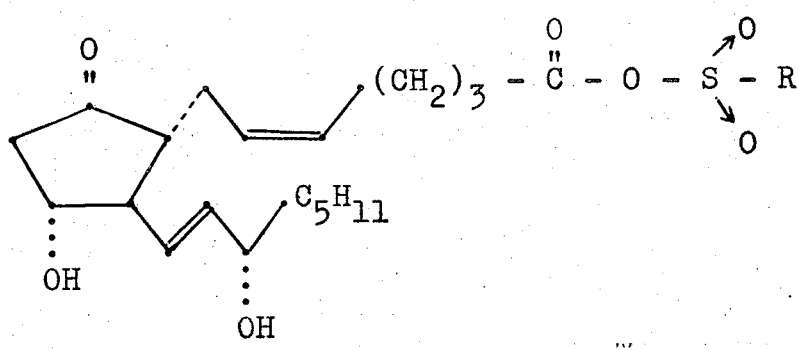
$\xrightarrow{R'-OH}$
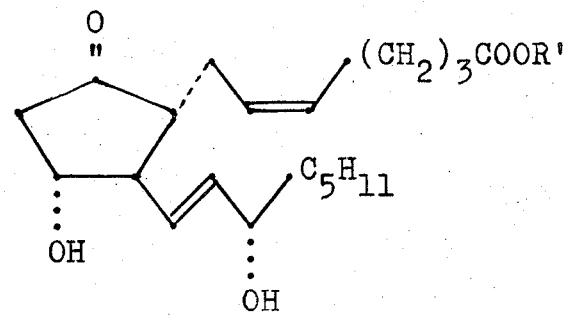
Prostaglandin $F_{2\alpha}$
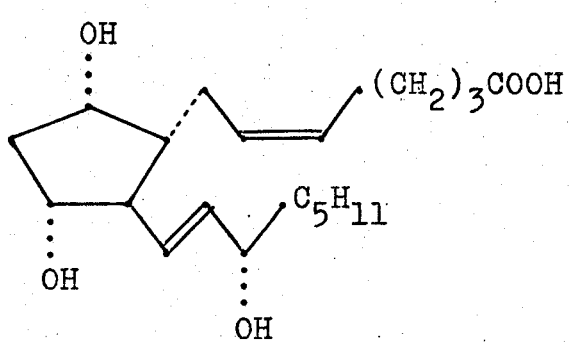
$\xrightarrow{\text{(1) Tertiary amine}}{\text{(2) } RSO_2X}$
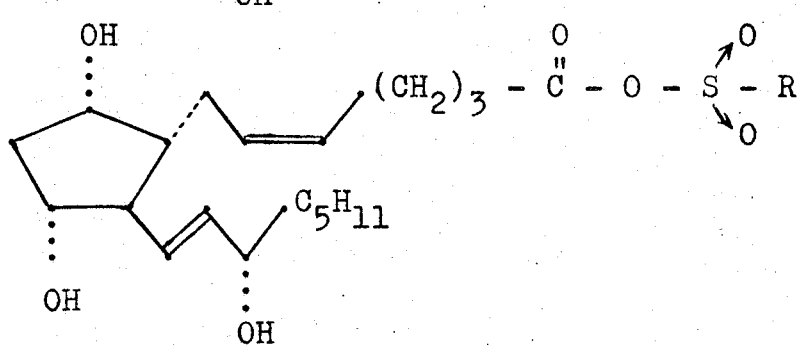
$\xrightarrow{R'-OH}$

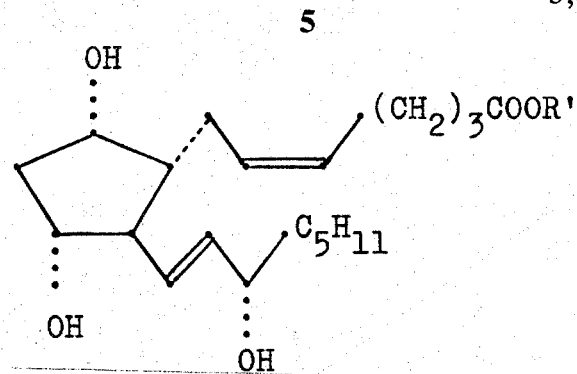
Prostaglandin A$_1$
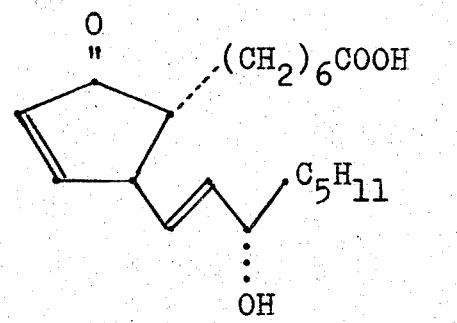
(1) Tertiary amine
(2) RSO$_2$X
$\longrightarrow$
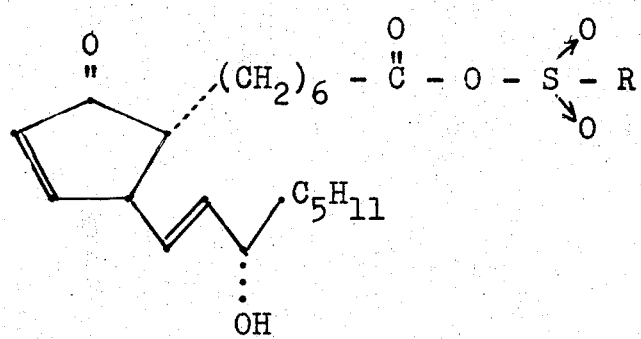
R'—OH
$\longrightarrow$
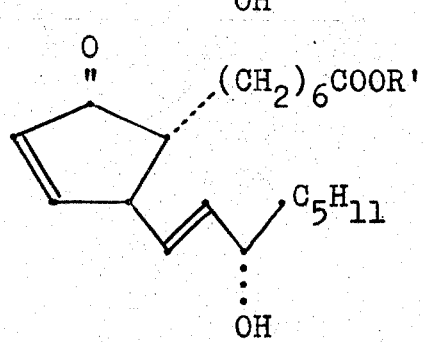
Prostaglandin A$_2$
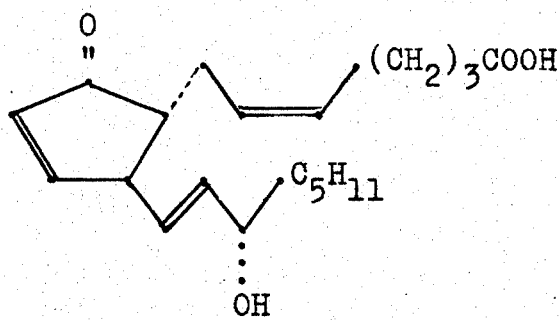
(1) Tertiary amine
(2) RSO$_2$X
$\longrightarrow$

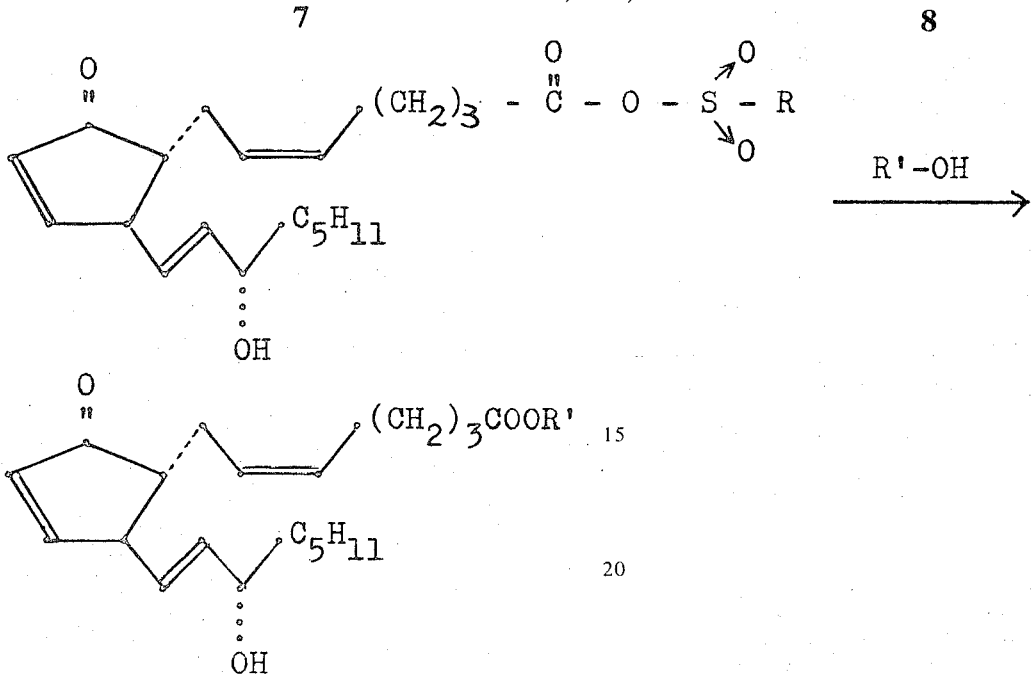

In the above formulae, RSO₂X represents an alkylsulfonyl halide or phenylsulfonyl halide, and R'OH represents an alkyl alcohol, substituted alkyl alcohol or polyhydric alcohol.

In carrying out the process of this invention, a prostaglandin is dissolved in an excess of an alcohol or in a solution of an excess of an alcohol dissolved in a proper organic solvent. While stirring the solution at the room temperature or under cooling with ice, a tertiary amine is added thereto. After a few minutes, an alkylsulfonyl halide or phenylsulfonyl halide is added to the mixture. Then the solution is stirred at the room temperature for about 5 minutes to 1 hour.

After the termination of the reaction, the reaction mixture is washed with water, and then the organic layer is concentrated under reduced pressure to obtain crude product, which is separated and purified by column chromatography on silica gel.

The organic solvent may be any suitable one which does not participate in the reaction, such as methylene chloride, ether or chloroform.

As for the tertinary amine it is preferable to employ trimethylamine, triethylamine, tributylamine, trioctylamine, pyridine or the like.

It is preferable that the amount of the tertiary amine is equal or in a small excess of 2 equivalents to the prostaglandin used.

The amount of the alcohol to be added may be 1 to 50 mols per mol of the prostaglandin. The amount of the sulfonyl halide may be equivalent to or in a small excess of one equivalent to the prostaglandin used.

As for the alcohols there may be used various compounds because, as explained before, the process of this invention can be effectively proceeded regardless of the chemical structure of the alcohol. Thus, alkyl alcohols, substituted alkyl alcohols and polyhydric alcohols may be used.

Examples of alkyl alcohols are straight chained or branched alcohols or cycloalkyl alcohols having up to 14 carbon atoms, e.g. methyl alcohol, ethyl alcohol, propyl alcohol, butyl alcohol, amyl alcohol, hexyl alcohol, heptyl alcohol, octyl alcohol, nonyl alcohol, decyl alcohol, dodecyl alcohol, tetradecyl alcohol, isopropyl alcohol, isobutyl alcohol, t-butyl alcohol, isoamyl alcohol, neopentyl alcohol, 2-ethyl butyl alcohol, 2-ethyl hexyl alcohol, cyclopentaonol, cyclohexanol, cyclohexyl methyl alcohol, β-cyclohexyl ethyl alcohol, etc.

As for substituted alkyl alcohols, there may be used alkyl alcohols substituted with aromatic or functional groups containing nitrogen, oxygen, halogen, etc. More particular examples thereof are benzyl alcohol, β-phenyl ethyl alcohol, α-phenyl ethyl alcohol, 3-phenyl propyl alcohol, cinnamyl alcohol, diethylaminoethyl alcohol, dimethyl amino ethyl alcohol, 2-pyridyl methyl alcohol, 3-pyridyl methyl alcohol, 2-phthalimido ethyl alcohol, 2-propoxy ethyl alcohol, 2-phenoxy ethyl alcohol, tetrahydro furfuryl alcohol, piperonyl alcohol, 8-carbethoxyl octyl alcohol, 9-carboethoxy nonyl alcohol, 11-carboethoxy undecyl alcohol, cholesterol, 2,2,3,3,4,4,5,5-octafluoro-1-pentyl alcohol, etc.

Examples of polyhydric alcohols which may be used are ethylene glycol, propylene glycol, 1,4-butane glycol, 1,6-hexane glycol, 1,8-octane glycol, 1,5-dihydroxy naphthalene, glycerol, etc.

The sulfonyl halide to be used in this invention is represented by the formula:

wherein R is a member selected from the group consisting of lower alkyl radicals (e.g. methyl and ethyl) and phenyl radicals substituted or not with lower alkyl radicals, and X is a halogen atom (e.g chlorine, bromine, etc.).

The process of this invention is applicable to the production of known prostaglandin esters. Further, according to this invention, there can be produced various novel prostaglandin esters which are, for example, as follows:

Prostaglandin $E_1$-n-decyl ester,
Prostaglandin $E_2$-tetrahydrofurfuryl ester,
Prostaglandin $F_{2\alpha}$-9-carboethoxynonyl ester,
Prostaglandin $A_2$-2-diethylaminoethyl ester,
Prostaglandin $E_2$-2-propoxyethyl ester,
Prostaglandin $E_2$-2-phenoxyethyl ester,
Prostaglandin $E_2$-2-dimethylaminoethyl ester,
Prostaglandin $E_2$-2-diethylaminoethyl ester,
Prostaglandin $E_2$-2-phthalimidylethyl ester,
Prostaglandin $E_2$-piperonyl ester, Prostaglandin $E_2$-2-pyridyl methyl ester,
Prostaglandin $E_2$-3-pyridyl methyl ester,
Prostaglandin $E_2$-4-hydroxy butyl ester,
Prostaglandin $E_2$-6-hydroxy hexyl ester,
Prostaglandin $E_2$-8-hydroxy octyl ester,
Prostaglandin $E_2$-glycerol monoester,
Prostaglandin $E_2$-8-carboethoxyoctyl ester,
Prostaglandin $E_2$-9-carboethoxynonyl ester,
Prostaglandin $E_2$-11-carboethoxyundecyl ester,
Prostaglandin $E_1$-tetrahydrofurfuryl ester,
Prostaglandin $E_1$cholesterd ester,
Prostaglandin $A_1$-2-dimethylaminoethyl ester,
Prostaglandin $A_2$-2-dimethylaminoethyl ester,
Prostaglandin $A_2$-4-hydroxybutyl ester,
Prostaglandin $A_2$-6-hydroxyhexyl ester, and
Prostaglandin $A_2$-8-hydroxyoctyl ester.

Upon conducting screening tests of inhibiting effect on histamine-induced asthma of the prostaglandin esters of this invention, it has been found that these esters have excellent inhibiting effects.

Thus, for example, when a screening test of protective drugs for experimental asthema of animals as reported by Iwasawa et al. (Folia Pharmacologica Japonica 63 28 - 41 (1967) ) was conducted, it was found that each of 2-diethylaminoethyl ester, 8-carboethoxyoctyl ester and 9-carboethoxy nonyl ester of prostaglandin $E_2$ is more than 10 and 7 times as effective as, respectively, isoproterenol and prostaglandin $E_1$ used as control drugs.

Further, when each of such esters as 4-hydroxybutyl ester, 6-hydroxyhexyl ester, 8-hydroxyoctyl ester and tetrahydrofurfuryl ester of this invention was injected intravenously into a barbital-anesthetized dog, it has been found that its hypotensive effect is much superior to that of prostaglandin $E_2$.

The above results indicate that the prostaglandin esters of this invention have a clinically significant value.

The invention will be further explained by referring to the following Examples which are given for the illustration purpose only and not for limiting the scope of this invention.

Example 1

56.3 mg. of prostaglandin $E_1$, 35.5 mg. of triethyl amine and 0.4 ml. of n-decyl alcohol were dissolved in 1 ml. of dry methylene chloride. After the solution was stirred for 5 minutes, 33.7 mg. of paramethylbenzolsulfonyl chloride was added. The mixture was further stirred at the room temperature for 30 minutes. The reaction solution was diluted with 50 ml. of cyclohexane and purified by Column-chromatography on 10 g. of silica gel. First, the by-product and alcohol were eluted and removed with a mixture of cyclohexane and ethyl acetate (4:1). Then eluting with a mixture of cyclohexane and ethyl acetate (3:2), 53.5 mg. of prostaglandin $E_1$-n-decyl ester was obtained in a 68.0 percent yield. Colorless crystals. Infrared absorptions (neat) were at 3320 (hydroxyl group), 2920, 2850, 1740 (ester, ketone), 1470 and 970 cm$^{-1}$.
Elemental analysis:

|  | C | H |
|---|---|---|
| Calculated : | 72.83 % | 10.99 % |
| Found : | 72.71 %. | 11.06 % |

Example 2

51.1 mg. of prostaglandin $E_2$, 32.2 mg. of triethylamine and 0.4 ml. of tetrahydrofurfuryl alcohol were dissolved in 1 ml. of dry methylene chloride. After stirring for 5 minutes, 35.4 mg. of benzolsulfonyl bromide was added to the solution. The mixture was further stirred at the room temperature for 30 minutes. Then 50 ml. of ethyl acetate was added to the reaction solution and the reaction solution was washed with water. The ethyl acetate layer was separated and drived over sodium sulfate and then concentrated under reduced pressure. The obtained concentrated residue was purified by column chromatography on silica gel. The product was eluted with mixtures of cyclohexane and ethyl acetate first at a ratio of 2:1 and then at a ratio of 1:1 to obtain 25.6 mg. of prostaglandin $E_2$-tetrahydrofurfuryl ester in a 40.2 percent yield. Colorless oily substance. Infrared absorptions (neat) were at 3400 (hydroxyl group), 2930, 2860, 1740 (ester, ketone), 1460, 1250, 1160, 1085 and 970 cm$^{-1}$.
Elemental analysis:

|  | C | H |
|---|---|---|
| Calculated : | 68.77 % | 9.24 % |
| Found : | 68.54 % | 9.39 % |

Example 3

32.1 mg. of prostaglandin $F_2$ , 20.2 mg. of triethylamine and 0.3 ml. of 9-carboethoxynonyl alcohol were dissolved in 1 ml. of dry methylene chloride. After stirring for 5 minutes, 17.7 mg. of benzolsulfonyl chloride was added to the solution. The mixture was further stirred at the room temperature for 30 minutes. Then the reaction solution was diluted with 50 ml. of cyclohexane and purified by column-chromatography on 10 g. of silica gel. The byproduct and alcohol were eluted and removed with mixtures of cyclohexane and ethyl acetate first at a ratio of 4:1 and then at a ratio of 3:2. The product was eluted with mixtures of cyclohexane and ethyl acetate (successively at ratio of 1:1 and 2:3) to obtain 22.6 mg. of prostaglandin $F_{2\alpha}$-9-carboethoxynonyl ester in a 45.2 percent yield. Colorless oily product. Infrared absorptions (chloroform solution) were at 3400 (hydroxyl group), 2920, 2850, 1725 (ester), 1460, 1240, 1180 and 970 cm$^{-1}$.
Elemental analysis:

|  | C | H |
|---|---|---|
| Calculated : | 69.53 % | 10.21 % |
| Found : | 69.66 % | 10.42 % |

Example 4

34.5 mg. of prostaglandin $A_2$, 23.0 mg. of triethylamine and 0.2 ml. of diethylaminoethanol were dissolved in 1 ml. of dry methylene chloride. After stirring for 5 minutes, 20.2 mg. of benzolsulfonyl chloride was added to the solution. The mixture was further stirred at the room temperature for 30 minutes. Then 25 ml. of ethyl acetate was added to the reaction solution and the reaction solution was washed with water. The ethyl acetate layer was separated and dried over sodium sulfate and then concentrated under reduced pressure. The obtained concentrated residue was purified by column-chromatography on 5 g. of silica gel. The product was eluted with ethyl acetate to obtain 30.0 mg. of prostaglandin $A_2$-2-diethylaminoethyl ester in a 67.3 percent yield. Yellow oily product. Infrared absorptions (chloroform solution) were at 3400 (hydroxy group), 2920, 2850, 1725 (ester), 1700 (ketone), 1585, 1450, 1170 and 970 cm$^{-1}$.
Elemental analysis:

|  | C | H | N |
|---|---|---|---|
| Calculated: | 72.01 % | 10.00 % | 3.23 % |
| Found: | 72.26 % | 10.08 % | 3.09 % |

In the same manner, the following esters were obtained.

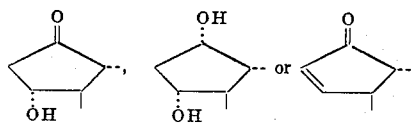

| Prostaglandin E₂ ester | Appearance | Infrared absorption (cm⁻¹) | Elemental analysis | | | |
|---|---|---|---|---|---|---|
| | | | Calculated | | Found | |
| | | | C (%) | H (%) | C (%) | H (%) |
| 2-propoxyethyl ester | Colorless oily | 3400, 2920, 2850, 1740, 1240, 1160, 1130, 970 | 68.46 | 9.65 | 68.28 | 9.79 |
| 2-phenoxyethyl ester | Colorless crystalline | 3380, 2920, 2850, 1740, 1600, 1500, 1250, 1160, 1080, 970, 760, 695 | 71.16 | 8.53 | 71.22 | 8.73 |
| 2-dimethylaminoethyl ester | Yellow oily | 3400, 2920, 2850, 2760, 1735, 1460, 1375, 1240, 1160, 1080, 970 | 68.05 (3.31 % N) | 9.76 | 68.23 (3.20 % N) | 9.81 |
| 2-diethylaminoethyl ester | Yellow oily | 3400, 2920, 2850, 1735, 1460, 1375, 1240, 1160, 1070, 970 | 69.14 (3.10 % N) | 10.04 | 69.26 (2.86 % N) | 10.30 |
| 2-phthalimidylethyl ester | Yellow oily | 3450, 3400, 2920, 2850, 1775, 1740, 1710, 1430, 1395, 1240, 1160, 1080, 970 | 68.55 (2.67 % N) | 7.48 | 68.45 (2.77 % N) | 7.56 |
| Piperonyl ester | Colorless oily | 3380, 2920, 2850, 1740, 1500, 1440, 1240, 1150, 1040, 970, 925 | 69.11 | 7.87 | 69.32 | 7.98 |
| Tetrahydrofurfuryl ester | Colorless oily | 3400, 2930, 2860, 1740, 1460, 1250, 1160, 1985, 970 | 68.77 | 9.24 | 68.54 | 9.39 |
| 2-pyridylmethyl ester | Yellow oily | 3380, 2920, 2850, 1735, 1595, 1435, 1240, 1155, 1080, 970 | 70.40 (3.16 % N) | 8.41 | 70.28 (3.36 % N) | 8.64 |
| 3-pyridylmethyl ester | Yellow oily | 3360, 2920, 2850, 1735, 1600, 1425, 1240, 1155, 1080, 970 | 70.40 (3.16 % N) | 8.41 | 70.48 (3.28 % N) | 8.39 |
| 4-hydroxybutyl ester | Colorless oily | 3380, 2920, 2850, 1735, 1245, 1160, 1070, 970 | 67.89 | 9.50 | 67.63 | 9.46 |
| 6-hydroxyhexyl ester | Colorless crystalline | 3380, 2920, 2850, 1740, 1460, 1245, 1160, 1080, 970 | 68.99 | 9.80 | 69.03 | 9.68 |
| 8-hydroxyoctyl ester | Colorless crystalline | 3380, 2920, 2850, 1740, 1460, 1245, 1160, 1080, 970 | 69.96 | 10.07 | 69.73 | 10.31 |
| Glycerol monoester | Yellow oily | 3380, 2920, 2850, 1740, 1450, 1245, 1160, 1070, 970 | 64.76 | 8.98 | 64.51 | 8.99 |
| 8-carboethoxyoctyl ester | Colorless crystalline | 3400, 2920, 2850, 1735, 1460, 1245, 1160, 1070, 970 | 69.37 | 9.77 | 69.20 | 9.94 |
| 9-carboethoxynonyl ester | Colorless oily | 3400, 2920, 2850, 1730, 1460, 1240, 1180, 1080, 970 | 69.78 | 9.88 | 69.93 | 9.92 |
| 11-carboethoxyundecyl ester | Colorless crystalline | 3400, 2920, 2850, 1735, 1460, 1245, 1160, 1070, 970 | 70.55 | 10.10 | 70.37 | 10.28 |
| Prostaglandin E₁ ester | | | | | | |
| n-decyl ester | Colorless crystalline | 3320, 2920, 2850, 1740, 1470, 970 | 72.83 | 10.99 | 72.71 | 11.06 |
| Tetrahydrofurfuryl ester | Colorless oily | 3380, 2920, 2850, 1730, 1450, 1230, 1160, 1080, 970 | 68.46 | 9.65 | 68.44 | 9.72 |
| Cholesterol ester | Colorless oily | 3370, 2920, 2850, 1735, 1460, 1380, 1170, 1070, 970 | 78.06 | 10.87 | 78.32 | 10.94 |
| Prostaglandin F₂ ester | | | | | | |
| 9-carboethoxynonyl ester | Colorless oily | 3400, 2920, 2850, 1725, 1460, 1240, 1180, 970 | 69.53 | 10.21 | 69.66 | 10.42 |
| Prostaglandin A₁ ester | | | | | | |
| 2-dimethylaminoethyl ester | Yellow oily | 3450, 2920, 2850, 2760, 1735, 1710, 1585, 1460, 1180, 970 | 70.72 (3.44 % N) | 10.14 | 70.66 (3.21 % N) | 10.38 |
| Prostaglandin A₂ ester | | | | | | |
| 2-dimethylaminoethyl ester | Yellow oily | 3400, 2920, 2850, 2760, 1725, 1700, 1585, 1450, 1170, 970 | 71.07 (3.45 % N) | 9.69 | 70.98 (3.56 % N) | 9.83 |
| 2-diethylaminoethyl ester | Yellow oily | 3400, 2920, 2850, 1725, 1700, 1585, 1450, 1170, 970 | 72.01 (3.23 % N) | 10.00 | 72.26 (3.09 % N) | 10.08 |
| 4-hydroxybutyl ester | Colorless oily | 3400, 2920, 2850, 1720, 1700, 1585, 1450, 1180, 975 | 70.90 | 9.42 | 71.13 | 9.44 |
| 6-hydroxyhexyl ester | Colorless oily | 3420, 2920, 2850, 1720, 1700, 1585, 1450, 1180, 975 | 71.85 | 9.74 | 71.78 | 9.92 |
| 8-hydroxyoctyl ester | Colorless oily | 3400, 2920, 2850, 1720, 1700, 1585, 1450, 1180, 975 | 72.69 | 10.02 | 72.90 | 10.09 |

What we claim is:

1. A prostanoic acid ester having the structure

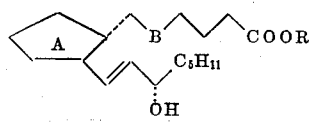

in which A is

B is —CH=CH— or —CH₂—CH₂—, and R is 4-hydroxybutyl, 6-hydroxyhexyl, or 8-hydroxyoctyl.

2. The prostanoic acid ester of claim 1 in which A is

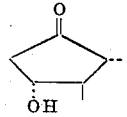

and B is —CH=CH—.

3. The ester of claim 2 in which R is 4-hydroxybutyl.

4. The ester of claim 2 in which R is 6-hydroxyhexyl.

5. The ester of claim 2 in which R is 8-hydroxyoctyl.

6. The prostanoic acid ester of claim 1 in which A is

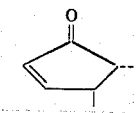

and B is —CH=CH—.

7. The ester of claim 6 in which R is 4-hydroxybutyl.

8. The ester of claim 6 in which R is 6-hydroxyhexyl.

9. The ester of claim 6 in which R is 8-hydroxyoctyl.

10. The prostanoic acid ester of claim 1 in which A is

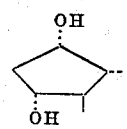

and B is —CH=CH—.

11. The ester of claim 10 in which R is 4-hydroxybutyl.

12. The ester of claim 10 in which R is 6-hydroxyhexyl.

13. The ester of claim 10 in which R is 8-hydroxyoctyl.

* * * * *